United States Patent
Jung et al.

(10) Patent No.: US 10,681,350 B2
(45) Date of Patent: Jun. 9, 2020

(54) PICTURE ENCODING AND DECODING METHODS AND APPARATUSES, AND PICTURE ENCODING AND DECODING SYSTEM

(71) Applicant: ZTE Corporation, Shenzhen (CN)

(72) Inventors: Cheolkon Jung, Shenzhen (CN); Shengtao Yu, Shenzhen (CN); Peng Ke, Shenzhen (CN); Ming Li, Shenzhen (CN); Ping Wu, Shenzhen (CN); Guoqiang Shang, Shenzhen (CN); Zhao Wu, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 2 days.

(21) Appl. No.: 16/084,065

(22) PCT Filed: Mar. 18, 2017

(86) PCT No.: PCT/CN2017/077167
§ 371 (c)(1),
(2) Date: Sep. 11, 2018

(87) PCT Pub. No.: WO2017/129147
PCT Pub. Date: Aug. 3, 2017

(65) Prior Publication Data
US 2019/0289289 A1    Sep. 19, 2019

(30) Foreign Application Priority Data

Jan. 31, 2016  (CN) .......................... 2016 1 0066327
Sep. 30, 2016  (CN) .......................... 2016 1 0875185
Dec. 1, 2016   (CN) .......................... 2016 1 1111206

(51) Int. Cl.
H04N 19/44    (2014.01)
H04N 19/124   (2014.01)
(Continued)

(52) U.S. Cl.
CPC ......... *H04N 19/124* (2014.11); *H04N 19/117* (2014.11); *H04N 19/172* (2014.11);
(Continued)

(58) Field of Classification Search
CPC .... H04N 19/124; H04N 19/186; H04N 19/98; H04N 19/85
See application file for complete search history.

(56) References Cited

U.S. PATENT DOCUMENTS

2009/0317017 A1   12/2009   Au
2016/0005153 A1   1/2016    Atkins
(Continued)

FOREIGN PATENT DOCUMENTS

CN   101511025 A   8/2009
CN   103051901 A   4/2013
(Continued)

OTHER PUBLICATIONS

International Search Report for corresponding application PCT/CN2017/077167 filed Mar. 18, 2017; dated May 31, 2017.
(Continued)

*Primary Examiner* — Tsion B Owens
(74) *Attorney, Agent, or Firm* — Cantor Colburn LLP

(57) ABSTRACT

Provided are picture encoding and decoding methods and apparatuses, and a picture encoding and decoding system. The picture encoding method includes: determining an adjustment factor according to pixel sampling values of a video picture; converting the video picture according to the adjustment factor, and encoding the converted video picture;
(Continued)

and writing the adjustment factor into a bitstream obtained by encoding the converted video picture.

12 Claims, 7 Drawing Sheets

(51) Int. Cl.
| | |
|---|---|
| *H04N 19/117* | (2014.01) |
| *H04N 19/172* | (2014.01) |
| *H04N 19/186* | (2014.01) |
| *H04N 19/85* | (2014.01) |
| *H04N 19/98* | (2014.01) |

(52) U.S. Cl.
CPC .......... *H04N 19/186* (2014.11); *H04N 19/44* (2014.11); *H04N 19/85* (2014.11); *H04N 19/98* (2014.11)

(56) References Cited

U.S. PATENT DOCUMENTS

| | | | |
|---|---|---|---|
| 2016/0316207 A1* | 10/2016 | Minoo | H04N 19/136 |
| 2017/0026646 A1* | 1/2017 | Minoo | H04N 19/124 |
| 2017/0085895 A1* | 3/2017 | Gu | H04N 19/44 |

FOREIGN PATENT DOCUMENTS

| | | |
|---|---|---|
| CN | 105828089 A | 8/2016 |
| WO | 2010105036 A1 | 9/2010 |

OTHER PUBLICATIONS

Ajit Motra et al., "An adaptive Logluv transform for High Dynamic Range Video Compression", 2010 17th IEEE International Conference on Image Processing, Sep. 2010, pp. 2061-2064, XP031815210.

C. Jung, "CE2-related: Adaptive PQ: Adaptive Perceptual Quantizer for HDR video Coding with HEVC Main 10 Profile", Joint Collaborative Team on Video Coding, 23rd Meeting, Feb. 19-26, 2016.

European Search Report for corresponding application 17 743 762.1; Report dated Dec. 14, 2018.

Francois E. et al, "CE2: Report on the HDR CE2.2,a Test", 113. MPEG Meeting, Oct. 18, 2015, XP030065456.

Lasserre S. et al, Technicolor's response to CFE for HDR and WGC (catergory 1), 112. MPEG meeting, Jun. 21, 2015, XP030064631.

Rocco Goris, "Philips Response to CFE for HDR and WCG", ISO/IEJ JTC1/SC29/WG11 MPEG2015, Jul. 2015.

Scott Miller, Perceptual Signal Coding for More Efficient Usage of Bit Codes, Technical Paper, IEE Explore, May/Jun. 2013.

* cited by examiner

PICTURE ENCODING AND DECODING METHODS AND APPARATUSES, AND PICTURE ENCODING AND DECODING SYSTEM

TECHNICAL FIELD

The present disclosure relates to the field of video picture encoding and decoding, and in particular to picture encoding and decoding methods and apparatuses, and a picture encoding and decoding system.

BACKGROUND

Along with the continuous development of broadband networks and display technologies, people have a higher expectation on quality of video pictures. Compared with a common video, a High-Dynamic Range (HDR) video can expand contrast and color simultaneously and greatly. In a picture, a bright portion may be brighter and thus a real environment can be reflected better and the visual experience can be improved.

An HDR video storage format adopted in a related technology needs to occupy a lot of storage spaces and hence designing a new encoding method according to characteristics of the HDR video is a key problem for the HDR video. A Perceptual Quantizer (PQ) is adopted by a Moving Picture Experts Group (MPEG) standard organization to convert the HDR video so as to adapt the HDR video to an H.265/HEVC Main 10 Profile encoder.

An HDR video encoding method based on the PQ in a related technology performs uniform encoding in a fixed and very huge luminance range and does not consider an actual luminance range of the HDR video. Therefore, the HDR video encoding method based on the PQ often cannot fully utilize a quantization value (under a condition in which the number of encoding bits is fixed) and has quantization loss when a specific HDR video is encoded.

For the above technical problems in a related technology, no effective solution has been provided yet at present.

SUMMARY

Some embodiments of the present disclosure provides picture encoding and decoding methods and apparatuses, and a picture encoding and decoding system, which may at least solve problems that a quantization value cannot be fully utilized and the deficiency of quantization loss is present when a specific High Data Rate (HDR) video is encoded in a related technology.

According to an embodiment of the present disclosure, there is provided a video encoding method based on an adaptive PQ, which is applied to an encoding end. The video encoding method based on the adaptive PQ includes: a quantization adjustment factor is determined according to a video picture to be processed; the video picture to be processed is processed according to the quantization adjustment factor to obtain a video bitstream; the quantization adjustment factor is processed and an input bitstream is obtained by combining a processing result of the quantization adjustment factor with the video bitstream; and the input bitstream is transferred to a codec for encoding and decoding.

Optionally, the act that the quantization adjustment factor is determined according to the video picture to be processed may include: color space conversion is performed on the video picture to be processed, and luminance components of the video picture subjected to the color space conversion are obtained; a maximum luminance value and a minimum luminance value in the luminance components are extracted; and the quantization adjustment factor is determined according to the maximum luminance value and the minimum luminance value.

Optionally, the act that the quantization adjustment factor is determined according to the maximum luminance value and the minimum luminance value may include: a quantization adjustment factor ratio is determined according to a formula I:

$$\text{ratio} = \frac{0.9}{0.46 + 0.22[\log_{10}(Y_{max} - Y_{min}) - 2]} \quad \text{formula I}$$

where the $Y_{max}$, is the maximum luminance value and the $Y_{min}$ is the minimum luminance value.

Optionally, the act that the video picture to be processed is processed according to the quantization adjustment factor to obtain the video bitstream may include: an adaptive encoding function APQ_TF(L) is determined based on a formula II:

$$\text{APQ\_TF}(L) = \left(\frac{c_1 + c_2 L_1^{m_1^{new}}}{1 + c_3 L_1^{m_1^{new}}}\right)^{m_2} \quad \text{formula II}$$

where $m_1^{new} = m_1 \times \text{ratio}$, coefficients $m_1$ and $m_2$ respectively are 0.1593 and 78.8438, and coefficients $c_1$, $c_2$ and $c_3$ respectively are 0.8359, 18.8516 and 18.6875;

pixel value components of the video picture to be processed are extracted; the pixel value components are calibrated based on the adaptive encoding function APQ_TF(L) to obtain calibrated components; and the calibrated components are processed to obtain the video bitstream.

Optionally, the act that the quantization adjustment factor is processed and the input bitstream is obtained by combining the processing result of the quantization adjustment factor with the video bitstream may include: binarization processing is performed on the quantization adjustment factor and a processing result of the quantization adjustment factor is encoded to obtain a bitstream; and the bitstream is written into a data unit and the input bitstream having the bitstream is obtained by combining the data unit with the video bitstream, wherein the data unit may include: a parameter set, or a supplemental information unit, or a user-defined data unit.

According to another embodiment of the present disclosure, there is provided a video encoding method based on an adaptive PQ, which is applied to a decoding end. An HDR video compression encoding method based on the adaptive PQ includes: an input bitstream is parsed to obtain a quantization adjustment factor and a video bitstream to be decoded; and the video bitstream to be decoded is processed according to the quantization adjustment factor to obtain a final video picture.

Optionally, the act that the input bitstream is parsed to obtain the quantization adjustment factor and the video bitstream to be decoded may include: the input bitstream is parsed to obtain the video bitstream to be decoded and a data unit from the input bitstream; a bitstream is obtained from the data unit; and the bitstream is processed to obtain the quantization adjustment factor, wherein the data unit may include: a parameter set, or a supplemental information unit, or a user-defined data unit.

Optionally, the act that the video bitstream to be decoded is processed according to the quantization adjustment factor to obtain the final video picture may include: the video bitstream to be decoded is processed to obtain a video picture to be restored, and pixel value components of the video picture to be restored are extracted; and an adaptive inverse encoding function inverseAPQ_TF is determined according to the quantization adjustment factor ratio based on a formula III:

$$\text{inverseAPQ\_TF}(N) = \left( \frac{\max[(N^{1/m_2} - c_1), 0]}{c_2 - c_3 N^{1/m_2}} \right)^{1/m_1^{new}} \quad \text{formula III}$$

where $m_1^{new} = m_1 \times \text{ratio}$, coefficients $m_1$ and $m_2$ respectively are 0.1593 and 78.8438, and coefficients $c_1$, $c_2$ and $c_3$ respectively are 0.8359, 18.8516 and 18.6875; and a function max(x, y) represents to select a maximum value in x and y; the pixel value components of the video picture to be restored are calibrated based on the adaptive inverse encoding function inverseAPQ_TF to obtain calibrated components; and reconstruction is performed based on the calibrated components to obtain the final video picture.

According to another embodiment of the present disclosure, there is provided a video encoding system based on an adaptive PQ. The video encoding system based on the adaptive PQ may include: a first control unit, configured to execute the above-mentioned video encoding method based on the adaptive PQ; and a second control unit, configured to execute the above-mentioned video encoding method based on the adaptive PQ.

According to still another embodiment of the present disclosure, there is provided a picture encoding method, which includes: an adjustment factor is determined according to pixel sampling values of a video picture; a video picture is converted according to the adjustment factor, and the converted video picture is encoded; and the adjustment factor is written into a bitstream obtained by encoding the converted video picture.

Optionally, the act that the adjustment factor is determined according to the pixel sampling values of the video picture may include: the pixel sampling values of the video picture are converted into pixel luminance values; a maximum luminance value and a minimum luminance value in the pixel luminance values are determined; and the adjustment factor is determined according to the maximum luminance value and the minimum luminance value.

Optionally, the act that the adjustment factor is determined according to the maximum luminance value and the minimum luminance value may include: a difference between the maximum luminance value and the minimum luminance value is calculated; a first adjustment factor is set equal to a linear weighted value of a logarithmic value of the difference; and the adjustment factor is set equal to the first adjustment factor, or the adjustment factor is set equal to a reciprocal value of the first adjustment factor.

Optionally, the act that the video picture is converted according to the adjustment factor may include: sampling components of the pixel sampling values of the video picture are calibrated according to the adjustment factor; and conversion values of the sampling components are obtained according to output values obtained by calibration.

Optionally, a manner for calibrating the sampling components of the pixel sampling values of the video picture may include: performing exponential mapping of the sampling components using a power value being set equal to the adjustment factor or a weighted value of the adjustment factor.

Optionally, the act that the adjustment factor is written into the bitstream obtained by encoding the converted video picture may include: binarization processing is performed on a value of the adjustment factor; an output of the binarization processing is encoded, and encoding bits are written into a data unit in the bitstream obtained by encoding the converted video picture, wherein the data unit may include at least one of: a parameter set, a supplemental information unit, and a user-defined data unit.

Optionally, a manner for performing the binarization processing on the value of the adjustment factor may at least include one of the followings: converting the value of the adjustment factor into a value represented in a binary form; converting the value of the adjustment factor into one or more integer values represented in corresponding binary forms.

According to still another embodiment of the present disclosure, there is provided a picture encoding apparatus, which includes: a determination module, configured to determine an adjustment factor according to pixel sampling values of a video picture; an encoding module, configured to convert the video picture according to the adjustment factor and encode the converted video picture; and a writing module, configured to write the adjustment factor into a bitstream obtained by encoding the converted video picture.

Optionally, the determination module may include: a conversion unit, configured to convert the pixel sampling values of the video picture into pixel luminance values; a first determination unit, configured to determine a maximum luminance value and a minimum luminance value in the pixel luminance values; and a second determination unit, configured to determine the adjustment factor according to the maximum luminance value and the minimum luminance value.

Optionally, the second determination unit may include: a calculation subunit, configured to calculate a difference between the maximum luminance value and the minimum luminance value; a first setting subunit, configured to set a first adjustment factor equal to a linear weighted value of a logarithmic value of the difference; and a second setting subunit, configured to set the adjustment factor equal to the first adjustment factor, or set the adjustment factor equal to a reciprocal value of the first adjustment factor.

Optionally, the encoding module may include: a first calibration unit, configured to calibrate sampling components of the pixel sampling values of the video picture according to the adjustment factor; and an encoding unit, configured to obtain conversion values of the sampling components according to output values obtained by calibration.

Optionally, the first calibration unit may include: a first mapping subunit, configured to perform exponential mapping of the sampling components using a power value being set equal to the adjustment factor or a weighted value of the adjustment factor.

Optionally, the writing module may include: a binarization unit, configured to perform binarization processing on a value of the adjustment factor; and a writing unit, configured to encode an output of the binarization processing, and write encoding bits into a data unit in the bitstream obtained by encoding the converted video picture, wherein the data unit may include at least one of: a parameter set, a supplemental information unit, and a user-defined data unit.

Optionally, the binarization unit may at least include one of the followings: a first conversion subunit, configured to convert the value of the adjustment factor into a value represented in a binary form; a second conversion unit, configured to convert the value of the adjustment factor into one or more integer values represented in corresponding binary forms.

According to still another embodiment of the present disclosure, there is provided a picture decoding method, which includes: a bitstream is parsed to obtain an adjustment factor; and a reconstructed picture is converted according to the adjustment factor, wherein the reconstructed picture may include: a picture obtained by decoding the bitstream, or a picture obtained by performing post-processing on the picture obtained by decoding the bitstream.

Optionally, the act that the bitstream is parsed to obtain the adjustment factor may include: a data unit in the bitstream is parsed to obtain a parameter for determining the adjustment factor, wherein the data unit may include at least one of: a parameter set, a supplemental information unit and a user-defined data unit; and a value of the adjustment factor is determined according to the parameter.

Optionally, the act that the value of the adjustment factor is determined according to the parameter may include: the value of the adjustment factor is set equal to a value of the parameter; or, the value of the adjustment factor is set equal to an output value obtained by performing calculation on the parameter according to a preset operational rule.

Optionally, the act that the reconstructed picture is converted according to the adjustment factor may include: sampling components of pixel sampling values of the reconstructed picture are calibrated according to the adjustment factor; and conversion values of the sampling components are calculated according to output values obtained by calibration.

Optionally, a manner for calibrating the sampling components of the pixel sampling values of the reconstructed picture may include: performing exponential mapping of the sampling components using a power value being set equal to the adjustment factor or a weighted value of the adjustment factor.

According to still another embodiment of the present disclosure, there is provided a picture decoding apparatus, which includes: a decoding module, configured to parse a bitstream to obtain an adjustment factor; and a conversion module, configured to convert a reconstructed picture according to the adjustment factor, wherein the reconstructed picture may include: a picture obtained by decoding the bitstream, or a picture obtained by performing post-processing on the picture obtained by decoding the bitstream.

Optionally, the decoding module may include: a decoding unit, configured to parse a data unit in the bitstream to obtain a parameter for determining the adjustment factor, wherein the data unit may include at least one of: a parameter set, a supplemental information unit and a user-defined data unit; and a third determination unit, configured to determine a value of the adjustment factor determined according to the parameter.

Optionally, the third determination unit may include: a third setting subunit, configured to set the value of the adjustment factor equal to the value of the parameter; or a fourth setting subunit, configured to set the value of the adjustment factor equal to an output value obtained by performing calculation on the parameter according to a preset operational rule.

Optionally, the conversion module may include: a second calibration unit, configured to calibrate sampling components of pixel sampling values of the reconstructed picture according to the adjustment factor; and a calculation unit, configured to calculate conversion values of the sampling components according to output values obtained by calibration.

Optionally, the second calibration unit may include: a second mapping subunit, configured to perform exponential mapping of the sampling components using a power value being set equal to the adjustment factor or a weighted value of the adjustment factor.

According to still another embodiment of the present disclosure, there is provided a picture encoding and decoding system, which includes the above-mentioned encoding apparatus and the above-mentioned picture decoding apparatus.

According to still another embodiment of the present disclosure, there is further provided a storage medium; and the storage medium is configured to store a program code for executing the following acts:

a quantization adjustment factor is determined according to a video picture to be processed; the video picture to be processed is processed according to the quantization adjustment factor to obtain a video bitstream; the quantization adjustment factor is processed and an input bitstream is obtained by combining a processing result of the quantization adjustment factor with the video bitstream; and the input bitstream is transferred to a codec for encoding and decoding.

Optionally, the storage medium is further configured to store a program code for executing the following acts:

color space conversion is performed on the video picture to be processed, and luminance components of the video picture subjected to the color space conversion are obtained; a maximum luminance value and a minimum luminance value in the luminance components are extracted; and the quantization adjustment factor is determined according to the maximum luminance value and the minimum luminance value.

According to still another embodiment of the present disclosure, there is further provided a storage medium; and the storage medium is configured to store a program code for executing the following acts: an input bitstream is parsed to obtain a quantization adjustment factor and a video bitstream to be decoded; and the video bitstream to be decoded is processed according to the quantization adjustment factor to obtain a final video picture Optionally, the storage medium is further configured to store a program code for executing the following acts:

the input bitstream is parsed to obtain the video bitstream to be decoded and a data unit from the input bitstream; a bitstream is obtained from the data unit; and the bitstream is processed to obtain the quantization adjustment factor, wherein the data unit may include: a parameter set, or a supplemental information unit, or a user-defined data unit.

According to some embodiments of the present disclosure, a quantization adjustment factor is determined according to a video picture to be processed; the video picture to be processed is processed according to the quantization adjustment factor to obtain a video bitstream; the quantization adjustment factor is processed and an input bitstream is obtained by combining a processing result of the quantization adjustment factor with the video bitstream; and the input bitstream is transferred to a codec for encoding and decoding.

Problems that a quantization value cannot be fully utilized and the deficiency of quantization loss is present when a specific HDR video is encoded in a related technology are solved, and effects of full utilization of the quantization value, accuracy improvement of encoding the HDR video and quantization loss reduction are achieved.

BRIEF DESCRIPTION OF THE DRAWINGS

The accompanying drawings are described here to provide deeper understanding of the present disclosure, and form a part of the present disclosure. The schematic embodiments and description of the present disclosure are adopted to explain the present disclosure, and do not form improper limits to the present disclosure. In the drawings:

FIG. 7 (b) is a local enlarged view of a reconstructed frame obtained by encoding Market 3 using an HDR anchor provided by the present disclosure;

FIG. 7 (c) is a reconstructed frame obtained by encoding Market 3 using a video encoding method based on an adaptive PQ provided by the present disclosure;

FIG. 7 (d) is a local enlarged view of a reconstructed frame obtained by encoding Market 3 using a video encoding method based on an adaptive PQ provided by the present disclosure;

FIG. 8 (b) is a first local enlarged view of a reconstructed frame obtained by encoding Balloon using an HDR anchor provided by the present disclosure;

FIG. 8 (c) is a second local enlarged view of a reconstructed frame obtained by encoding Balloon using an HDR anchor provided by the present disclosure;

FIG. 8 (d) is a reconstructed frame obtained by encoding Balloon using a video encoding method based on an adaptive PQ provided by the present disclosure;

FIG. 8 (e) is a first local enlarged view of a reconstructed frame obtained by encoding Balloon using a video encoding method based on an adaptive PQ provided by the present disclosure; and FIG. 8 (f) is a second local enlarged view of a reconstructed frame obtained by encoding Balloon using a video encoding method based on an adaptive PQ provided by the present disclosure.

DETAILED DESCRIPTION OF THE EMBODIMENTS

The present disclosure is described below with reference to the drawings and embodiments in detail. It should be noted that the embodiments of the present application and the characteristics of the embodiments may be combined with each other if there is no conflict.

It is to be noted that, terminologies such as "first" and "second" in the specification, claims and accompanying drawings of the present disclosure are only used to distinguish similar objects, rather than to describe a special order or a precedence order.

First Embodiment

Figure 1:
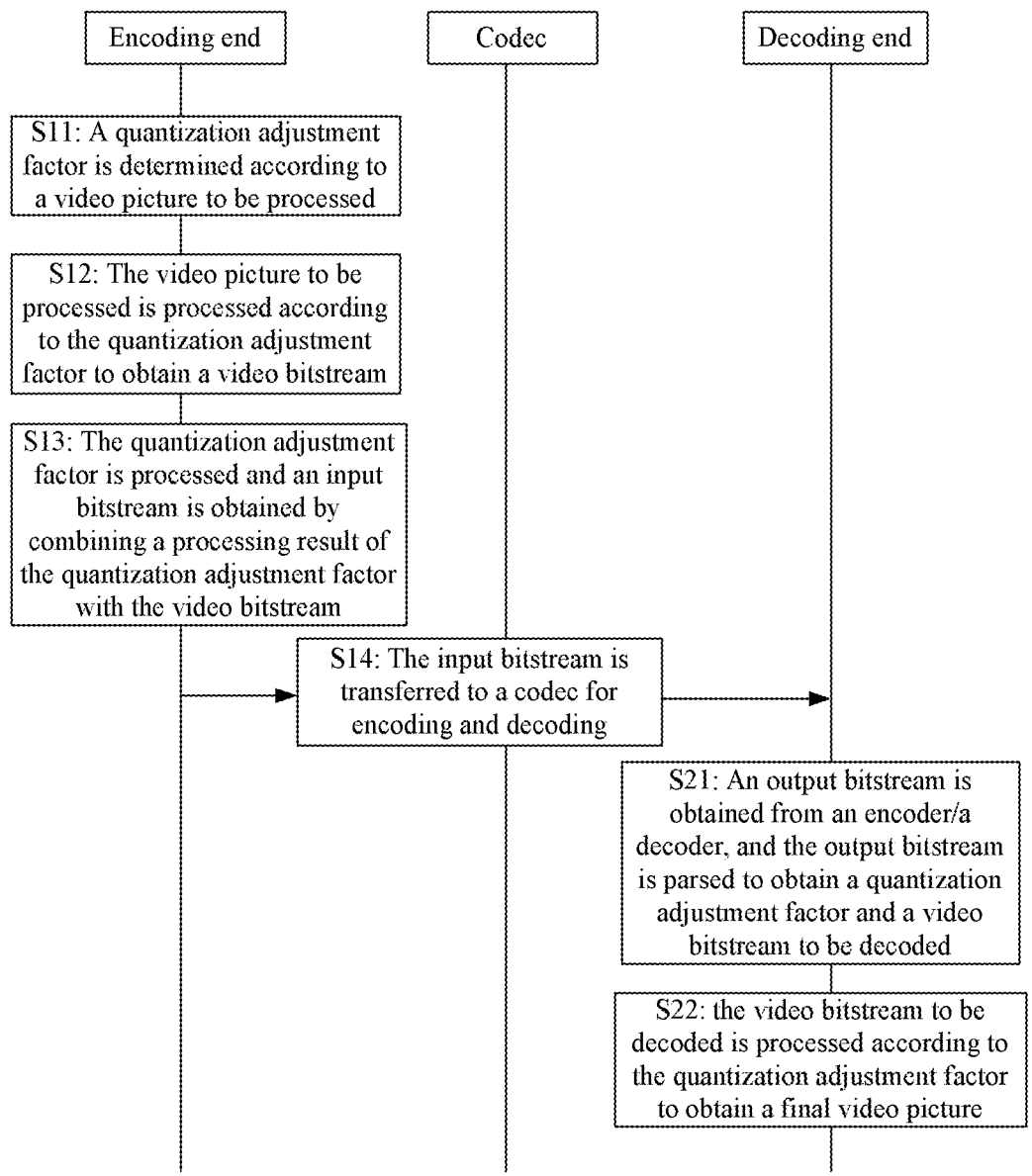
FIG. 1 is a flowchart of a video picture encoding and decoding method based on an adaptive PQ according to an embodiment of the present disclosure.

The embodiment of the present disclosure provides a video encoding method based on an adaptive PQ. FIG. 1 is a flowchart of a video picture encoding and decoding method based on an adaptive PQ according to an embodiment of the present disclosure. As shown in FIG. 1, the encoding and decoding method is divided into an encoding portion and a decoding portion, which will be described below respectively.

At an encoding end, an HDR video compression encoding method based on an adaptive PQ includes the following acts.

At act S11, a quantization adjustment factor is determined according to a video picture to be processed.

At act S12, the video picture to be processed is processed according to the quantization adjustment factor to obtain a video bitstream.

At act S13, the quantization adjustment factor is processed and an input bitstream is obtained by combining a processing result of the quantization adjustment factor with the video bitstream.

At act S14, the input bitstream is transferred to a codec for encoding and decoding.

Base on the above acts S11 to S14, during implementation of the embodiment of the present disclosure, the quantization adjustment factor is obtained first and then the video picture to be processed is processed according to the quantization adjustment factor to obtain a processed video bitstream. In addition, the quantization adjustment factor is processed, and the processed result is combined with the video bitstream to obtain the input bitstream. Through the video encoding method based on the adaptive PQ, it may be seen that an adaptive adjustment manner is used to process a video in this embodiment, the size of an adaptive adjustment quantized interval can be adjusted by the quantization adjustment factor obtained by calculation, and the quantization adjustment factor is related to the picture to be processed. Therefore, under a condition in which the number of encoding bits is fixed, a quantization value may be more fully used, the accuracy of encoding the HDR video is improved and the quantization loss is reduced. By adopting the solution, problems that a quantization value cannot be fully utilized and the deficiency of quantization loss is present when a specific HDR video is encoded in a related technology are solved.

In this embodiment of the present disclosure, with a 16-bit HDR video as an example, the method provided in the embodiment of the present disclosure is described.

The embodiment of the present disclosure provides a video encoding method based on an adaptive PQ, which includes: a quantization adjustment factor is determined according to a video picture to be processed; the video picture to be processed is processed according to the quantization adjustment factor to obtain a video bitstream; the quantization adjustment factor is processed and an input bitstream is obtained by combining a processing result of the quantization adjustment factor with the video bitstream; and the input bitstream is transferred to a codec for encoding and decoding. By encoding an HDR video using a perceptual driving method, not only can a luminance range visible to human eyes be encoded, but the number of bits required by encoding is also effectively reduced. Moreover, the size of a quantized interval is adjusted adaptively according to a luminance range of an input HDR video; and under a condition in which the number of encoding bits is fixed, a quantization value may be more fully used, the accuracy of encoding the HDR video is improved and the quantization loss is reduced.

Optionally, the act that the quantization adjustment factor is determined according to the video picture to be processed may include:

color space conversion is performed on the video picture to be processed, and luminance components of the video picture subjected to the color space conversion are obtained;

a maximum luminance value and a minimum luminance value in the luminance components are extracted; and the quantization adjustment factor is determined according to the maximum luminance value and the minimum luminance value.

During implementation, an implementation manner of the act S11 may include the following acts.

At act S101, color space conversion is performed on the video picture to be processed, and luminance components of the video picture subjected to the color space conversion are obtained.

At act S102, a maximum luminance value and a minimum luminance value in the luminance components are extracted.

At act S103, the quantization adjustment factor is determined according to the maximum luminance value and the minimum luminance value.

In this embodiment of the present disclosure, in order to obtain the quantization adjustment factor, the color space conversion is performed on the video picture to be processed first, for example, a Red Green Blue (RGB) color space is converted into a YCbCr color space. After the conversion, a luminance component, namely a Y component, of each pixel in the video picture is extracted.

Optionally, the extraction and conversion formula is as follows:

$$Y=0.262700*R+0.678000*G+0.059300*B$$

where the R is a value of a red component of a single pixel in the HDR video to be processed, the G is a value of a green component of a single pixel in the HDR video to be processed, and the B is a value of a blue component of a single pixel in the HDR video to be processed.

Then, after the luminance component of the each pixel in the video picture is obtained, the maximum luminance value and the minimum luminance value therein are extracted.

At last, a quantization adjustment factor corresponding to each pixel is determined based on the obtained maximum luminance value and the minimum luminance value, and the specific determination process is as follows.

Optionally, the act that the quantization adjustment factor is determined according to the maximum luminance value and the minimum luminance value may include:

a quantization adjustment factor ratio is determined according to a formula I:

$$\text{ratio} = \frac{0.9}{0.46 + 0.22[\log_{10}(Y_{max} - Y_{min}) - 2]}, \quad \text{formula I}$$

where the $Y_{max}$ is the maximum luminance value and the $Y_{min}$ is the minimum luminance value.

During implementation, to determine the quantization adjustment factor corresponding to each pixel, the specific determination process is as shown in the formula I.

It should be noted that the expression formula of the quantization adjustment factor ratio may further be as follows:

$$\frac{1}{\text{ratio}} = \frac{0.02}{0.9} + \frac{0.22*\log_{10}(Y_{max} - Y_{min})}{0.9}$$

The above form is provided because when floating-point calculation is performed in a computer, and the data processing precision may be improved via a form of adding two fractions.

Optionally, the act that the video picture to be processed is processed according to the quantization adjustment factor to obtain the video bitstream may include:

an adaptive encoding function APQ_TF(L) is determined based on a formula II:

$$\text{APQ\_TF}(L) = \left( \frac{c_1 + c_2 L^{m_1^{new}}}{1 + c_3 L^{m_1^{new}}} \right)^{m_2} \quad \text{formula II}$$

where $m_1^{new} = m_1 \times \text{ratio}$, coefficients $m_1$ and $m_2$ respectively are 0.1593 and 78.8438, and coefficients $c_1$, $c_2$ and $c_3$ respectively are 0.8359, 18.8516 and 18.6875; pixel value components of the video picture to be processed are extracted;

the pixel value components are calibrated based on the adaptive encoding function APQ_TF(L) to obtain calibrated components; and the calibrated components are processed to obtain the video bitstream.

During implementation, after the quantization adjustment factor is obtained, a manner for obtaining the video bitstream, namely the act S12, may be implemented by the following ways.

At act S201, an adaptive encoding function APQ_TF(L) is determined based on a formula II:

$$\text{APQ\_TF}(L) = \left( \frac{c_1 + c_2 L^{m_1^{new}}}{1 + c_3 L^{m_1^{new}}} \right)^{m_2} \quad \text{formula II}$$

where $m_1^{new} = m_1 \times \text{ratio}$, coefficients $m_1$ and $m_2$ respectively are 0.1593 and 78.8438, and coefficients $c_1$, $c_2$ and $c_3$ respectively are 0.8359, 18.8516 and 18.6875.

At act S202, pixel value components of the video picture to be processed are extracted.

The pixel value components extracted here are components of each pixel in three channels of the RGB color space in the video picture to be processed.

At act S203, the pixel value components are calibrated based on the adaptive encoding function APQ_TF(L) to obtain calibrated components.

Based on the adaptive encoding function APQ_TF(L) constructed in the act S201, the component of the each pixel in the three channels of the RGB color space in the video picture to be processed are calibrated and a specific reference formula for processing is as follows:

$$\begin{cases} R' = \text{APQ\_TF}(\max(0, \min(R/10000, 1))) \\ G' = \text{APQ\_TF}(\max(0, \min(G/10000, 1))) \\ B' = \text{APQ\_TF}(\max(0, \min(B/10000, 1))) \end{cases}$$

where the R is a value of a red component of a single pixel in the video picture to be processed, the G is a value of a green component of a single pixel in the video picture to be processed, the B is a value of a blue component of a single pixel in the video picture to be processed, the R' is a value of a red component of a single pixel in a calibrated video picture to be processed, the G' is a value of a green component of a single pixel in the calibrated video picture to be processed, the B' is a value of a blue component of a single pixel in the calibrated video picture to be processed, and a function max(x, y) represents to select a maximum value in x and y, and the min(x, y) represents to select a minimum value in x and y.

After the calibration based on the above formula, a new component value corresponding to each pixel in the video to be processed is obtained.

At act S204, the calibrated components are processed to obtain the video bitstream.

Based on a result obtained after the calibration in the act S203, the processing to obtain the video bitstream may include the following acts.

(1) Color space conversion: from R'G'B' to Y'CbCr.

A conversion matrix T during the conversion from the R'G'B' color space to the Y'CbCr color space is as follows:

$$T = \begin{bmatrix} 0.2672700 & 0.678000 & 0.059300 \\ -0.139630 & -0.360370 & 0.500000 \\ 0.500000 & -0.459786 & -0.040214 \end{bmatrix}$$

(2) A video after the color conversion is quantized to a 10-bit range.

Specifically, the following acts needs to be executed.

First, a bit depth BitDepth of a Y' component in a video after the color space conversion is extracted and a Cb component and a Cr component $\text{BitDepth}_C$ in the converted video are extracted.

In a specific implementation manner, since a quantization range of a HDR video to be processed needs to be converted from 16 bits into 10 bits, the $\text{BitDepth}_Y$ and the $\text{BitDepth}_C$ are both set equal to a target value 10.

Then, a quantization value $D_{Y'}$ corresponding to the Y' component, a quantization value $D_{Cb}$ corresponding to the Cb component, and a quantization value $D_{Cr}$ corresponding to the Cr component in a quantized video are obtained according to the formula V:

$$\begin{cases} D_{Y'} = \text{Clip1}_Y(\text{Round}((1 << (BitDepth_Y - 8)) * (219 * Y' + 16))) \\ D_{Cb} = \text{Clip1}_C(\text{Round}((1 << (BitDepth_C - 8)) * (224 * Cb + 128))) \\ D_{Cr} = \text{Clip1}_C(\text{Round}((1 << (BitDepth_C - 8)) * (224 * Cr + 128))) \end{cases}$$

where Round(x)=Sign(x)*Floor(Abs(x)+0.5).

To finish the calculation acts above:
First, according to $$\text{Sign}(x) = \begin{cases} -1, & x < 0 \\ 0, & x = 0 \\ 1, & x > 0 \end{cases},$$

$$\text{Clip3}(x, y, z) = \begin{cases} x, & z < x \\ y, & z > y \\ z, & \text{else} \end{cases} \text{ and}$$

$$\begin{cases} \text{Clip1}_Y(x) = \text{Clip3}(0, (1 << BitDepth_Y) - 1, x) \\ \text{Clip1}_C(x) = \text{Clip3}(0, (1 << BitDepth_C) - 1, x) \end{cases},$$

and a condition in which Floor (x) is a maximum integer smaller than or equal to x, an expression formula of a function Round(x) is determined.

Second, according to the above expression formula, the quantization value $D_{Y'}$ corresponding to the Y' component, the quantization value $D_{Cb}$ corresponding to the Cb component, and the quantization value $D_{Cr}$ corresponding to the Cr component are determined respectively, wherein the << is a left shift operator.

This process is determined by a standard test frame. Each pixel of a video output by a decoder is a 10-bit integer and the finally reconstructed video requires that the number of bits for each pixel point is 16-bit, so inverse quantization needs to be performed.

(3) A video format is converted from 4:4:4 to 4:2:0 by lower sampling processing.

Since a similar solution is present in related technologies, the content herein is not repeated.

Optionally, the act that the quantization adjustment factor is processed and the input bitstream is obtained by combining the processing result of the quantization adjustment factor with the video bitstream may include:

binarization processing is performed on the quantization adjustment factor and a processing result of the quantization adjustment factor is encoded to obtain a bitstream; and the bitstream is written into a data unit and the input bitstream having the bitstream is obtained by combining the data unit with the video bitstream, wherein the data unit may include: a parameter set, or a supplemental information unit, or a user-defined data unit.

During implementation, the specific processing manner of the act S13 may include the following acts.

At act S301, binarization processing is performed on the quantization adjustment factor and a processing result of the quantization adjustment factor is encoded to obtain a bitstream.

Herein, the binarization processing may be that a value of the quantization adjustment factor is directly converted into a value represented in a binary form, or a value of the quantization adjustment factor is converted into one or more integer values represented in corresponding binary forms based on a demand on a relatively high data processing precision. For more details, it may be referred to foregoing relevant description on the formula I.

At act S302, the bitstream is written into a data unit and the input bitstream having the bitstream is obtained by combining the data unit with the video bitstream.

Herein, the data unit may include a parameter set, or a supplemental information unit, or a user-defined data unit.

The reasons for implementing the process as shown in S301 to S302 lies in that: with the consideration to encode the video bitstream accurately, a variant of a description parameter on the video bitstream is increased particularly and the variant includes specific parameters of the video bitstream.

In an existing video encoding protocol, relevant description parameter may be stored in any one of the parameter set, the supplemental information unit and the user-defined data unit.

During actual encoding, one of the above three may be selected according to a specific condition of a developer.

After the act S302 is executed completely, the input bitstream including the video bitstream and the bitstream is obtained. The input bitstream is input to an HEVC Main 10 codec for subsequence encoding and decoding.

Correspondingly, at a decoding end, an HDR video compression encoding method based on an adaptive PQ includes the following acts.

At act S21, an output bitstream is obtained from an encoder/a decoder, and the output bitstream is parsed to obtain a quantization adjustment factor and a video bitstream to be decoded.

At act S22, the video bitstream to be decoded is processed according to the quantization adjustment factor to obtain a final video picture.

During implementation, the codec encodes and decodes the input bitstream to obtain the output bitstream.

At the decoding end, the output bitstream is parsed, the processing is performed according to a parsed content and the final video picture capable of reducing the quantization loss is obtained.

Optionally, the act that the input bitstream is parsed to obtain the quantization adjustment factor and the video bitstream to be decoded may include: the input bitstream is parsed to obtain the video bitstream to be decoded and a data unit from the input bitstream; a bitstream is obtained from the data unit; and the bitstream is processed to obtain the quantization adjustment factor, wherein the data unit may include a parameter set, or a supplemental information unit, or a user-defined data unit.

In this embodiment of the present disclosure, a manner in the act S21 may be implemented via the following acts.

At act S401, the input bitstream is parsed to obtain the video bitstream to be decoded and a data unit from the input bitstream.

The video bitstream to be decoded obtained by parsing is used for processing in subsequent acts to obtain the final video picture.

At act S402, a bitstream is obtained from the data unit.

It is mentioned in act S302 to store the variant for the description parameter of the video bitstream in any one of the parameter set, the supplemental information unit and the user-defined data unit. Therefore, the bitstream stored previously is extracted from the parameter set, the supplemental information unit and the user-defined data unit.

At S403, the bitstream is processed to obtain the quantization adjustment factor.

In order to obtain the quantization adjustment factor, it is appropriate to set the quantization adjustment factor equal to a parameter value in the bitstream, or set the quantization adjustment factor equal to an output value obtained by performing calculation on the parameter in the bitstream according to a preset operational rule.

After the quantization adjustment factor is obtained, the video bitstream to be decoded is processed based on the quantization adjustment factor in subsequent acts.

Optionally, the act that the video bitstream to be decoded is processed according to the quantization adjustment factor to obtain a final video picture may include: the video bitstream to be decoded is processed to obtain a video picture to be restored, and pixel value components of the video picture to be restored are extracted; and an adaptive inverse encoding function inverseAPQ_TF is determined according to the quantization adjustment factor ratio based on a formula III:

$$\text{inverseAPQ\_TF}(N) = \left(\frac{\max[(N^{1/m_2} - c_1), 0]}{c_2 - c_3 N^{1/m_2}}\right)^{1/m_1^{new}} \quad \text{formula III}$$

where $m_1^{new} = m_1 \times \text{ratio}$, coefficients $m_1$ and $m_2$ respectively are 0.1593 and 78.8438, and coefficients $c_1$, $c_2$ and $c_3$ respectively are 0.8359, 18.8516 and 18.6875; and a function $\max(x, y)$ represents to select a maximum value in x and y;

the pixel value components of the video picture to be restored are calibrated based on the adaptive inverse encoding function inverseAPQ_TF to obtain calibrated components; and reconstruction is performed based on the calibrated components to obtain the final video picture.

During implementation, an implementation manner of the act S22 may include the following acts.

At act S501, the video bitstream to be decoded is processed to obtain a video picture to be restored, and pixel value components of the video picture to be restored are extracted.

In this act, the process for obtaining the video picture to be restored may include the following sub-acts.

(1) A video format is converted from 4:2:0 into 4:4:4 through upper sampling processing.

It is an inverse processing process of the act (3) in the act S204. Likewise, since a similar solution is present in related technologies, the content herein is not repeated.

(2) A video after being sampled in a chroma is inversely quantized.

First, a bit depth $BitDepth_Y$ of a Y' component in a video after the upper sampling processing is extracted and a Cb component and a Cr component $BitDepth_C$ in an inversely converted video are extracted. And meanwhile, a quantization value $D_{Y'}$ corresponding to the Y' component, a quantization value $D_{Cb}$ corresponding to the Cb component, and a quantization value $D_{Cr}$ corresponding to the Cr component in the inversely converted video are obtained.

By inversely quantizing the video after the upper sampling processing to an original bit range according to a formula below, the inversely converted video composed of the components Y', Cb and Cr is obtained:

$$\begin{cases} Y' = Clip_{Y'}\left(\left(\frac{D_{Y'}}{1 << (BitDepth_Y - 8)} - 16\right) \Big/ 219\right) \\ Cb = Clip_{C'}\left(\left(\frac{D_{Cb}}{1 << (BitDepth_C - 8)} - 128\right) \Big/ 224\right) \\ Cr = Clip_{C'}\left(\left(\frac{D_{Cr}}{1 << (BitDepth_C - 8)} - 128\right) \Big/ 224\right) \end{cases}$$

where function $$\begin{cases} Clip1_{Y'}(x) = Clip3(0, 1.0, x) \\ Clip1_{C'}(x) = Clip3(-0.5, 0.5, x) \end{cases}$$

specific expression formula of the function Clip3:

$$\text{Clip3}(x, y, z) = \begin{cases} x, & z < x \\ y, & z > y \\ z, & \text{else} \end{cases}$$

After the processing in this act, the video after the upper sampling processing in the previous act may be converted from the 10-bit range into the original 16-bit range to facilitate the process in subsequent acts.

This process is determined by a standard test frame. Each pixel of a video output by a decoder is a 10-bit integer and the finally reconstructed video requires that the number of bits for each pixel point is 16-bit, so inverse quantization needs to be performed.

(3) Color space inverse conversion: from Y'CbCr to R'G'B'.

At this moment, the inversely quantized video is obtained after the processing process in act (2). It is further suggested to perform inverse conversion on a color space of the inversely quantized video, that is, the Y'CbCr color space is converted into the original R'G'B' color space. Specifically, the inverse conversion is based on the following formula:

$R' = \text{Clip}_{RGB}(Y' + 1.47460 * Cr)$ $G' = \text{Clip}_{RGB}(Y' - 0.16455 * Cb - 0.57135 * Cr)$ $B' = \text{Clip}_{RGB}(Y' + 1.88140 * Cb)$ According to the above formula, the color space inverse conversion is performed on the inversely quantized video, where $\text{Clip}_{RGB}(x) = \text{Clip3}(0, 1, x)$.

The color space inverse conversion needs to be performed here because it is determined by the standard test frame. The video output by the decoder is of an YCbCr format and the finally obtained video is required to be of an RGB format.

At act S502, an adaptive inverse encoding function inverseAPQ_TF is determined according to the quantization adjustment factor ratio based on a formula III:

$$\text{inverseAPQ\_TF}(N) = \left( \frac{\max[(N^{1/m_2} - c_1), 0]}{c_2 - c_3 N^{1/m_2}} \right)^{1/m_1^{new}} \quad \text{formula III}$$

where $m_1^{new} = m_1 \times \text{ratio}$, coefficients $m_1$ and $m_2$ respectively are 0.1593 and 78.8438, and coefficients $c_1$, $c_2$ and $c_3$ respectively are 0.8359, 18.8516 and 18.6875; and a function $\max(x, y)$ represents to select a maximum value in x and y.

At act S503, the pixel value components of the video picture to be restored are calibrated based on the adaptive inverse encoding function inverseAPQ_TF to obtain calibrated components.

According to the adaptive inverse encoding function inverseAPQ_TF, the pixel value components of the video picture to be restored are calibrated, and the calibration process is based on the following formula:

$$\begin{cases} R = 10000 * \text{inverseAPQ\_TF}(R') \\ G = 10000 * \text{inverseAPQ\_TF}(G') \\ B = 10000 * \text{inverseAPQ\_TF}(B') \end{cases}$$

where the R' is a value of a red component of a single pixel in the inversely converted video, the G' is a value of a green component of a single pixel in the inversely converted video, the B' is a value of a blue component of a single pixel in the inversely converted video, the R is a value of a red component of a single pixel in a calibrated video, the G is a value of a green component of a single pixel in the calibrated picture, the B is a value of a blue component of a single pixel in the calibrated picture.

After calibration, component values corresponding to R, G and B channels that are corresponding to each pixel in the video picture to be restored are obtained.

At act S504, reconstruction is performed based on the calibrated components to obtain the final video picture.

Based on the component values, corresponding to the R, G and B channels that are corresponding to the each pixel in the video picture to be restored, obtained after the processing in the act S503, the picture reconstruction is performed to obtain the final video picture.

In the entire processing process, the quantization adjustment factor is calculated according to luminance maximum and minimum values of the video to be processed. The adaptive encoding conversion function is obtained according to the quantization adjustment factor and an input video to be processed is converted. The quantization adjustment factor is written into the bitstream obtained by encoding the converted video picture. A video converted by the adaptive encoding conversion function is preprocessed and is converted into an HEVC Main 10 supported format. A preprocessed video is encoded and decoded using the HEVC Main 10 and a decoded video is post-processed. The bitstream is parsed to obtain the quantization adjustment factor. An adaptive inverse encoding conversion function is obtained according to the quantization adjustment factor, and a post-processed video is converted to obtain the reconstructed HDR video.

By encoding the HDR video using an HVS-based perceptual driving method, not only can a luminance range visible to human eyes be encoded, but the number of bits required by encoding is also effectively reduced. Moreover, the size of a quantized interval is adjusted adaptively according to a luminance range of an input HDR video; and under a condition in which the number of encoding bits is fixed, a quantization value may be more fully used, and the accuracy of encoding the HDR video is improved.

During processing, fewer bits will be distributed to an area not sensitive to the human eyes and more bits will be distributed to an area sensitive to the human eyes, so a satisfactory result under the condition in which the number of encoding bits is fixed is obtained. The calculation of the quantization adjustment factor is relevant to the luminance of the input HDR video. The original method (namely, the PQ) is to set a fixed luminance range and the mentioned method is to calculate the luminance range according to the video. The larger the luminance range, the large the corresponding distortion. The smaller the luminance range, the smaller corresponding distortion (under a condition in which the number of bits is the same). Therefore, the distortion of the mentioned method is smaller than the original method, and the detailed result verification is referred to simulation experimental results hereinafter.

The embodiment of the present disclosure provides a video encoding method based on an adaptive PQ, which includes: a quantization adjustment factor is determined according to a video picture to be processed; the video picture to be processed is processed according to the quantization adjustment factor to obtain a video bitstream; and the quantization adjustment factor is processed and an input bitstream is obtained by combining a processing result of the quantization adjustment factor with the video bitstream. By encoding the HDR video using a perceptual driving method, not only can a luminance range visible to human eyes be encoded, but the number of bits required by encoding is also effectively reduced. Moreover, the size of a quantized interval is adjusted adaptively according to a luminance range of an input HDR video; and under a condition in which the number of encoding bits is fixed, a quantization value may be more fully used, the accuracy of encoding the HDR video is improved and the quantization loss is reduced.

Second Embodiment

Figure 2:
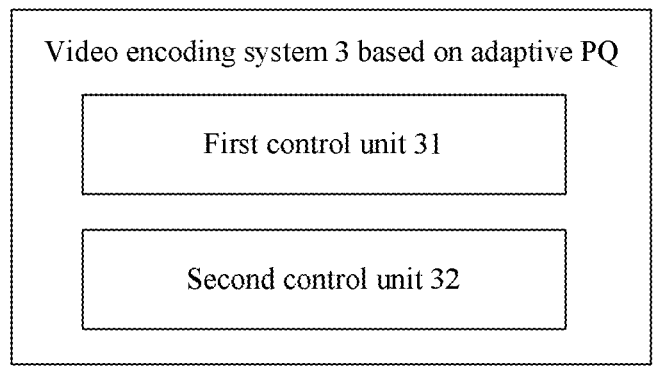
FIG. 2 is a structural schematic diagram of a video encoding system based on an adaptive PQ provided according to an embodiment of the present disclosure.

A video encoding system based on an adaptive PQ is provided. FIG. 2 is a structural schematic diagram of a video encoding system based on an adaptive PQ provided according to an embodiment of the present disclosure. As shown in FIG. 2, the video encoding system based on the adaptive PQ includes: a first control unit 31 and a second control unit 32.

The first control unit 31 is configured to execute the above-mentioned encoding method in the video encoding method based on the adaptive PQ.

The second control unit 32 is configured to execute the above-mentioned decoding method in the video encoding method based on the adaptive PQ.

The embodiment of the present disclosure provides a video encoding system based on an adaptive PQ, which includes: a quantization adjustment factor is determined according to a video picture to be processed; the video picture to be processed is processed according to the quantization adjustment factor to obtain a video bitstream; and the quantization adjustment factor is processed and an input bitstream is obtained by combining a processing result of the quantization adjustment factor with the video bitstream. By encoding an HDR video using a perceptual driving method, not only can a luminance range visible to human eyes be encoded, but the number of bits required by encoding is also effectively reduced. Moreover, the size of a quantized interval is adjusted adaptively according to a luminance range of an input HDR video; and under a condition in which the number of encoding bits is fixed, a quantization value may be more fully used, the accuracy of encoding the HDR video is improved and the quantization loss is reduced.

Corresponding to the first embodiment and the second embodiment, the embodiments of the present disclosure further provide a picture encoding method and a picture decoding method.

Third Embodiment

Figure 3:
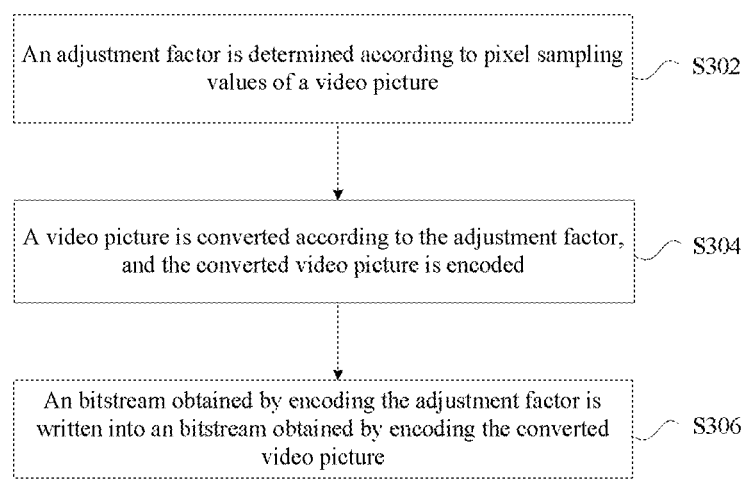
FIG. 3 is a flowchart of a picture encoding method according to an embodiment of the present disclosure.

An embodiment of the present disclosure provides a picture encoding method corresponding to the first embodiment. FIG. 3 is a flowchart of a picture encoding method according to an embodiment of the present disclosure. As shown in FIG. 3, the method includes the following acts.

At act S302: an adjustment factor is determined according to pixel sampling values of a video picture.

At act S304: a video picture is converted according to the adjustment factor, and the converted video picture is encoded.

At act S306: the adjustment factor is written into a bitstream obtained by encoding the converted video picture.

Optionally, a manner for determining the adjustment factor according to the pixel sampling values of the video picture in the act S302 may be implemented by the following acts.

At act S302-1: the pixel sampling values of the video picture are converted into pixel luminance values.

At act S302-2: a maximum luminance value and a minimum luminance value in the pixel luminance values are determined.

At act S302-3: the adjustment factor is determined according to the maximum luminance value and the minimum luminance value.

Optionally, a manner for determining the adjustment manner according to the maximum luminance value and the minimum luminance value in the act S302-3 may include the following acts.

At act S302-31: a difference between the maximum luminance value and the minimum luminance value is calculated.

At act S302-32: a first adjustment factor is set equal to a linear weighted value of a logarithmic value of the difference.

At act S302-33: the adjustment factor is set equal to the first adjustment factor, or the adjustment factor is set equal to a reciprocal value of the first adjustment factor.

Optionally, a manner for converting the video picture according to the adjustment factor in the act S304 in this embodiment of the present disclosure may include the following acts.

At act S304-1: sampling components of the pixel sampling values of the video picture are calibrated according to the adjustment factor.

At act S304-2: conversion values of the sampling components are obtained according to output values obtained by calibration.

It is to be noted that, a manner for calibrating the sampling components of the pixel sampling values of the video picture may include: performing exponential mapping of the sampling components using a power value being set equal to the adjustment factor or a weighted value of the adjustment factor.

Optionally, a manner in which the adjustment factor is written into the bitstream of the encoded video picture in the act S306 in this embodiment of the present disclosure may include the following acts.

At act S306-1: binarization processing is performed on a value of the adjustment factor.

At act S306-2: an output of the binarization processing is encoded, and encoding bits are written into a data unit in the bitstream obtained by encoding the converted video picture, wherein the data unit may include at least one of: a parameter set, a supplemental information unit, and a user-defined data unit.

Optionally, a manner for performing the binarization processing on the value of the adjustment factor may at least include one of the followings: converting the value of the adjustment factor into a value represented in a binary form; converting the value of the adjustment factor into one or more integer values represented in corresponding binary forms.

Figure 4:
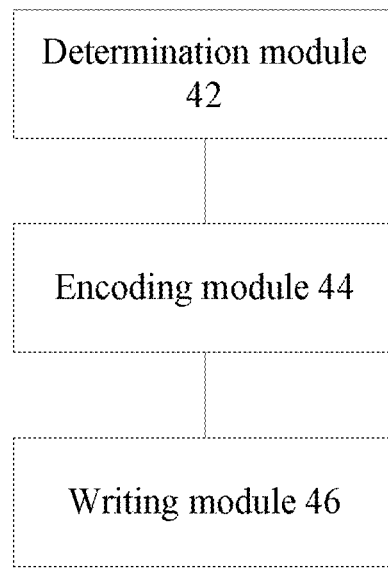
FIG. 4 is a structural schematic diagram of a picture encoding apparatus according to an embodiment of the present disclosure.

Based on the above picture encoding method, this embodiment provides a picture encoding apparatus. FIG. 4 is a structural schematic diagram of a picture encoding apparatus according to an embodiment of the present disclosure. As shown in FIG. 4, the apparatus includes: a determination module 42, configured to determine an adjustment factor according to pixel sampling values of a video picture; an encoding module 44, in coupled connection with the determination module 42 and configured to convert the video picture according to the adjustment factor and encode the converted video picture; and a writing module 46, in coupled connection with the encoding module 44 and configured to write the adjustment factor into a bitstream obtained by encoding the converted video picture.

Optionally, the determination module may include: a conversion unit, configured to convert the pixel sampling values of the video picture into pixel luminance values; a first determination unit, in coupled connection with the conversion unit and configured to determine a maximum luminance value and a minimum luminance value in the pixel luminance values; and a second determination unit, in coupled connection with the first determination unit and configured to determine the adjustment factor according to the maximum luminance value and the minimum luminance value.

Optionally, the second determination unit may include: a calculation subunit, configured to calculate a difference between the maximum luminance value and the minimum luminance value; a first setting subunit, in coupled connection with the calculation subunit and configured to set a first adjustment factor equal to a linear weighted value of a logarithmic value of the difference; and a second setting subunit, in coupled connection with the first setting subunit and configured to set the adjustment factor equal to the first adjustment factor, or set the adjustment factor equal to a reciprocal value of the first adjustment factor.

Optionally, the encoding module 44 may include: a first calibration unit, configured to calibrate sampling components of the pixel sampling values of the video picture according to the adjustment factor; and an encoding unit, in coupled connection with the first calibration unit and configured to obtain conversion values of the sampling components according to output values obtained by calibration.

Wherein, the first calibration unit may include: a first mapping subunit, configured to perform exponential mapping of the sampling components using a power value being set equal to the adjustment factor or a weighted value of the adjustment factor.

Optionally, the writing module 46 may include: a binarization unit, configured to perform binarization processing on a value of the adjustment factor; and a writing unit, in coupled connection with the binarization unit and configured to encode an output of the binarization processing, and write encoding bits into a data unit in the bitstream obtained by encoding the converted video picture, wherein the data unit may include at least one of: a parameter set, a supplemental information unit, and a user-defined data unit.

Optionally, the binarization unit may at least include one of the followings: a first conversion subunit, configured to convert the value of the adjustment factor into a value represented in a binary form; a second conversion unit, configured to convert the value of the adjustment factor into one or more integer values represented in corresponding binary forms.

Fourth Embodiment

Figure 5:
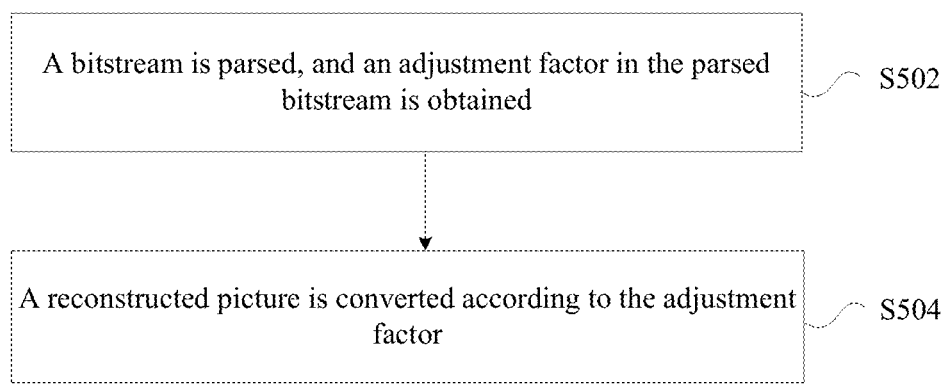
FIG. 5 is a flowchart of a picture decoding method according to an embodiment of the present disclosure.

Corresponding to the above second embodiment, the embodiments of the present disclosure further provide an imaging decoding method. FIG. 5 is a flowchart of a picture decoding method according to an embodiment of the present disclosure. As shown in FIG. 5, the method includes the following acts.

At act S502: a bitstream is parsed to obtain an adjustment factor

At act S504, a reconstructed picture is converted according to the adjustment factor.

The reconstructed picture may include: a picture obtained by decoding the bitstream, or a picture obtained by performing post-processing on the picture obtained by decoding the bitstream.

Optionally, in this embodiment of the present disclosure, the act S502 in which the bitstream is parsed to obtain the adjustment factor may include the following acts.

At act S502-1: a data unit in the bitstream is parsed to obtain a parameter for determining the adjustment factor, wherein the data unit may include at least one of: a parameter set, a supplemental information unit and a user-defined data unit.

At act S502-2: a value of the adjustment factor is determined according to the parameter.

The act that the value of the adjustment factor is determined according to the parameter may include: the value of the adjustment factor is set equal to a value of the parameter; or, the value of the adjustment factor is set equal to an output value obtained by performing calculation on the parameter according to a preset operational rule.

Optionally, the manner of converting the reconstructed picture according to the adjustment factor in the act S504 may include the following acts.

At act S504-1: sampling components of pixel sampling values of the reconstructed picture are calibrated according to the adjustment factor.

At act S504-2: conversion values of the sampling components are calculated according to output values obtained by calibration.

A manner for calibrating the sampling components of the pixel sampling values of the reconstructed picture may include: performing exponential mapping of the sampling components using a power value being set equal to the adjustment factor or a weighted value of the adjustment factor.

Figure 6:
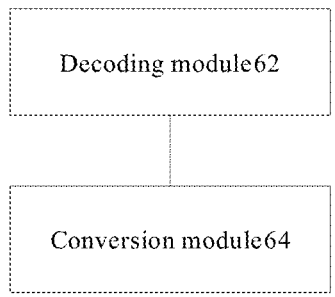
FIG. 6 is a structural schematic diagram of a picture decoding apparatus according to an embodiment of the present disclosure.
Figure 7A:
FIG. 7 (a) is a reconstructed frame obtained by encoding Market 3 using an HDR anchor provided by the present disclosure.
Figure 7B:
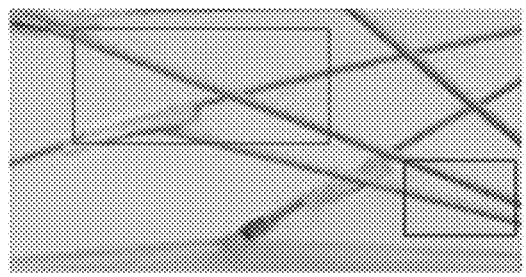
Figure 7C:
Figure 7D:
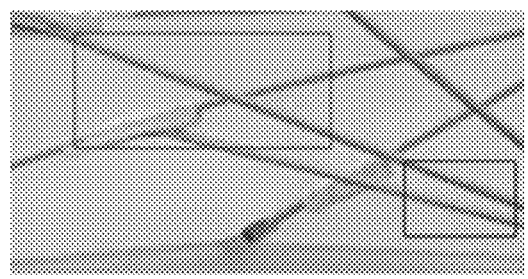
Figure 8A:
FIG. 8 (a) is a reconstructed frame obtained by encoding Balloon using an HDR anchor provided by the present disclosure.
Figure 8B:
Figure 8C:
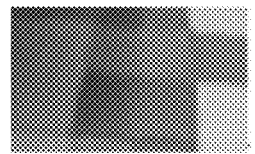
Figure 8D:
Figure 8E:
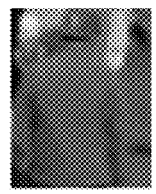
Figure 8F:
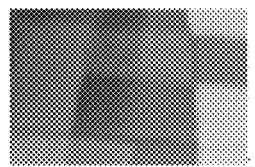

Based on the above picture decoding method, there is further provided a picture decoding apparatus. FIG. 6 is a structural schematic diagram of a picture decoding apparatus according to an embodiment of the present disclosure. As shown in FIG. 6, the apparatus includes: a decoding module 62, configured to parse a bitstream to obtain an adjustment factor; and a conversion module 64, in coupled connection with the decoding module 62 and configured to convert a reconstructed picture according to the adjustment factor, wherein the reconstructed picture may include: a picture obtained by decoding the bitstream, or a picture obtained by performing post-processing on the picture obtained by decoding the bitstream.

Optionally, the decoding module 62 may include: a decoding unit, configured to parse a data unit in the bitstream to obtain a parameter for determining the adjustment factor, wherein the data unit may include at least one of: a parameter set, a supplemental information unit and a user-defined data unit; and a third determination unit, configured to determine a value of the adjustment factor determined according to the parameter.

Optionally, the third determination unit may include: a third setting subunit, configured to set the value of the adjustment factor equal to the value of the parameter; or a fourth setting subunit, configured to set the value of the adjustment factor equal to an output value obtained by performing calculation on the parameter according to a preset operational rule.

Optionally, the conversion module 64 may include: a second calibration unit, configured to calibrate sampling components of pixel sampling values of the reconstructed picture according to the adjustment factor; and a calculation unit in coupled connection with the second calibration unit and configured to calculate conversion values of the sampling components according to output values obtained by calibration.

Optionally, the second calibration unit may include: a second mapping subunit, configured to perform exponential mapping of the sampling components using a power value being set equal to the adjustment factor or a weighted value of the adjustment factor.

Fifth Embodiment

Based on the above third and fourth embodiments, the embodiment provides a picture encoding and decoding system, which includes the encoding apparatus in the third embodiment and the picture decoding apparatus in the fourth embodiment.

The effect in this embodiment of the present disclosure may further be described based on a following simulation experiment.

1. Simulation Conditions:

Central Processing Unit (CPU): Intel® Core™ i3-kernel processor M350; main frequency: 2.27 GHZ; memory: 2G; operation system: WINDOWS 7; simulation platform: HEVC Main 10 reference software HM16.6.

Two 16-bit HDR video test sequences with a 4:4:4 format (Market3 and Balloon) are selected in simulation. The resolution is 1920*1080. A Main 10 Profile is adopted for encoding. Values of an HM 16.6 QP are respectively set equal to 21, 25, 29 and 33, 50 encoding frames are provided, and a Group of Picture (GOP) structure is of I frame +49P frame.

2. Simulation Content

In the simulation experiment, a performance test is respectively performed on the two video sequences using the method of the embodiment of the present disclosure and the existing HDR video compression encoding system.

Simulation I: the HDR anchor and the method of the embodiment of the present disclosure are employed to encode the Market3 video sequence. Table 1 and table 2 respectively show tPSNR and PSNR-DE for the HDR anchor and the method of the embodiment of the present disclosure when the Market3 sequence is encoded.

TABLE 1

Encoding results of the HDR anchor (Market3 sequence)

| QP | tPSNR_X | tPSNR_Y | tPSNR_Z | tPSNR_XYZ | PSNR_DE |
|----|---------|---------|---------|-----------|---------|
| 33 | 33.890  | 34.085  | 31.873  | 33.162    | 30.643  |
| 29 | 36.208  | 36.559  | 33.821  | 35.350    | 31.223  |
| 25 | 38.864  | 39.355  | 36.057  | 37.835    | 32.232  |
| 21 | 41.633  | 42.391  | 38.308  | 40.394    | 33.090  |

TABLE 2

Encoding results of the method of the embodiment of the present disclosure (Market3 sequence)

| QP | tPSNR_X | tPSNR_Y | tPSNR_Z | tPSNR_XYZ | PSNR_DE |
|----|---------|---------|---------|-----------|---------|
| 33 | 34.033  | 34.222  | 31.950  | 33.274    | 30.764  |
| 29 | 36.405  | 36.751  | 33.938  | 35.508    | 31.394  |
| 25 | 39.108  | 39.612  | 36.183  | 38.023    | 32.319  |
| 21 | 41.894  | 42.671  | 38.474  | 40.608    | 33.181  |

The tPSNR values indicate the differences between a reconstructed video and an original video. The larger the tPSNR, the better the quality of the reconstructed video. The PSNR-DE values indicate the differences between the reconstructed video and the original video in color. The larger the PSNR-DE, the better the color of the reconstructed video is kept. Through the table 1 and the table 2, it may be seen that the video quality reconstructed with the method of the embodiment of the present disclosure is better than the HDR anchor and can keep the color better.

Simulation II: the HDR anchor and the method of the embodiment of the present disclosure are employed to encode the Balloon video sequence. Table 3 and table 4 respectively show tPSNR and PSNR-DE for the HDR anchor and the method of the embodiment of the present disclosure when the Balloon sequence is encoded.

TABLE 3

Encoding results of the HDR anchor (Balloon sequence)

| QP | tPSNR_X | tPSNR_Y | tPSNR_Z | tPSNR_XYZ | PSNR_DE |
|----|---------|---------|---------|-----------|---------|
| 33 | 36.048  | 37.591  | 33.154  | 35.198    | 32.723  |
| 29 | 38.374  | 40.221  | 35.094  | 37.368    | 33.734  |
| 25 | 40.977  | 43.073  | 37.351  | 39.813    | 34.993  |
| 21 | 43.596  | 46.056  | 39.523  | 42.216    | 36.045  |

TABLE 4

Encoding results of the method of the embodiment of the present disclosure (Balloon sequence)

| QP | tPSNR_X | tPSNR_Y | tPSNR_Z | tPSNR_XYZ | PSNR_DE |
|----|---------|---------|---------|-----------|---------|
| 33 | 36.170  | 37.703  | 33.197  | 35.276    | 32.842  |
| 29 | 38.521  | 40.346  | 35.169  | 37.471    | 33.731  |
| 25 | 41.148  | 43.193  | 37.402  | 39.905    | 35.166  |
| 21 | 43.733  | 46.162  | 39.589  | 42.305    | 36.168  |

Through the table 3 and the table 4, it may be seen that the video quality reconstructed with the method of the embodiment of the present disclosure is better than the HDR anchor and can keep the color better (when QP=29, the PSNR-DE is slightly decreased, but such decrease is very small).

Simulation III: when QP=29, the HDR anchor and the method of the embodiment of the present disclosure are employed to encode a test sequence Market3 to obtain a reconstructed picture at a second frame of the test video, as shown in FIG. 7 (a)-(d).

FIG. 7 (a) is a reconstructed frame obtained by processing using an HDR anchor.

FIG. 7 (b) is a local enlarged view of the FIG. 7 (a).

FIG. 7 (c) is a reconstructed frame obtained by processing using a method of the embodiment of the present disclosure.

FIG. 7 (d) is a local enlarged view of FIG. 7 (c).

It may be seen from comparison in FIG. 7 (a)-(d), the visual perceptual quality of a reconstructed picture obtained by the method of the disclosure is better than the HDR anchor. Not only may more structure information and detailed information in the original picture be kept and the vagueness be reduced (a blue box in FIG. 5(d)), but also the color of the original picture can be kept better (a red box in FIG. 5 (d)).

Simulation IV: when QP=29, the HDR anchor and the method of the embodiment of the present disclosure are employed to encode a test sequence Balloon to obtain a reconstructed picture at an eighth frame of the test video, as shown in FIG. 8 (a)-(f).

FIG. 8 (a) is a reconstructed frame obtained by processing using an HDR anchor.

FIGS. 8 (*b*) and (*c*) are local enlarged views of different areas in FIG. 8 (*a*).

FIG. 8 (*d*) is a reconstructed frame obtained by processing using the method of the embodiment of the present disclosure.

FIGS. 8 (*e*) and (*f*) are local enlarged views of different areas in FIG. 8 (*d*).

By comparing the FIGS. 8 (*b*) and (*e*), it may be observed that the method of the embodiment of the present disclosure can better keep the color of the original picture. Through the comparison on FIGS. 8 (*c*) and (*f*), it may be observed that the reconstructed picture obtained with the method of the embodiment of the present disclosure has clearer structures and details. Therefore, the visual perceptual quality of the reconstructed picture obtained with the method of the embodiment of the present disclosure is better than the HDR anchor.

The simulation experimental results show that, by encoding the HDR video with the adaptive perceptual driving method in the present disclosure, distributing fewer bits to an area not sensitive to the human eyes and distributing more bits to an area sensitive to the human eyes, not only can a luminance range visible to the human eyes be encoded, but the number of bits required by encoding is also effectively reduced. Moreover, the size of a quantized interval is adjusted adaptively according to a luminance range of an input HDR video, a quantization value may be more fully used, and the accuracy of encoding the HDR video is improved.

Optionally, specific examples in this embodiment may be referred to the examples described in the above embodiments and optional implementation manners, and will not be repeated in this embodiment.

Obviously, those skilled in the art should know that each module or each act of the present disclosure may be implemented by a universal computing device, and the modules or acts may be concentrated on a single computing device or distributed on a network formed by a plurality of computing devices, and may optionally be implemented by program codes executable for the computing devices, so that the modules or acts may be stored in a storage device for execution with the computing devices, the shown or described acts may be executed in sequences different from those described here in some circumstances, or may form each integrated circuit module respectively, or multiple modules or acts therein may form a single integrated circuit module for implementation. Therefore, the present disclosure is not limited to any specific hardware and software combination.

The above are only the preferred embodiments of the present disclosure and not intended to limit the present disclosure. For those skilled in the art, the present disclosure may have various modifications and variations. Any modifications, equivalent replacements, improvements and the like made within the principle of the present disclosure shall fall within the scope of protection defined by the appended claims of the present disclosure.

INDUSTRIAL APPLICABILITY

In the picture encoding and decoding process provided by some embodiments of the present disclosure, the quantization adjustment factor is determined according to the video picture to be processed; the video picture to be processed is processed according to the quantization adjustment factor to obtain the video bitstream; the quantization adjustment factor is processed and the input bitstream is obtained by combining a processing result of the quantization adjustment factor with the video bitstream; and the input bitstream is transferred to the codec for encoding and decoding. Problems that a quantization value cannot be fully utilized and the deficiency of quantization loss is present when a specific HDR video is encoded in a related technology are solved, and effects of full utilization of the quantization value, accuracy improvement of encoding the HDR video and quantization loss reduction are achieved.

What is claimed is:

1. A picture encoding method, comprising:
   determining a quantization adjustment factor according to pixel sampling values of a video picture;
   converting the video picture according to the quantization adjustment factor, and encoding the converted video picture; and
   writing the quantization adjustment factor into a bitstream obtained by encoding the converted video picture;
   wherein determining the quantization adjustment factor according to the pixel sampling values of the video picture comprises:
   converting the pixel sampling values of the video picture into pixel luminance values;
   determining a maximum luminance value and a minimum luminance value in the pixel luminance values; and
   determining the quantization adjustment factor according to the maximum luminance value and the minimum luminance value;
   wherein determining the quantization adjustment factor according to the maximum luminance value and the minimum luminance value comprises:
   calculating a difference between the maximum luminance value and the minimum luminance value;
   setting a first quantization adjustment factor equal to a linear weighted value of a logarithmic value of the difference; and
   setting the quantization adjustment factor equal to the first quantization adjustment factor, or setting the quantization adjustment factor equal to a reciprocal value of the first quantization adjustment factor.

2. The method as claimed in claim 1, wherein converting the video picture according to the quantization adjustment factor comprises:
   calibrating sampling components of the pixel sampling values of the video picture according to the quantization adjustment factor, wherein a manner for calibrating the sampling components of the pixel sampling values of the video picture comprises: performing exponential mapping of the sampling components using a power value being set equal to the quantization adjustment factor or a weighted value of the quantization adjustment factor; and
   obtaining conversion values of the sampling components according to output values obtained by calibration.

3. The method as claimed in claim 1, wherein writing the quantization adjustment factor into the bitstream obtained by encoding the converted video picture comprises:
   performing binarization processing on a value of the quantization adjustment factor, wherein a manner for performing the binarization processing on the value of the quantization adjustment factor at least comprises one of the followings: converting the value of the quantization adjustment factor into a value represented in a binary form; converting the value of the quantization adjustment factor into one or more integer values represented in corresponding binary forms; and encoding an output of the binarization processing, and writing encoding bits into a data unit in the bitstream obtained by encoding the converted video picture, wherein the data unit comprises at least one of: a parameter set, a supplemental information unit, and a user-defined data unit.

4. A picture encoding apparatus, comprising:

a determination module, configured to determine a quantization adjustment factor according to pixel sampling values of a video picture;

an encoding module, configured to convert the video picture according to the quantization adjustment factor and encode the converted video picture; and a writing module, configured to write the quantization adjustment factor into a bitstream obtained by encoding the converted video picture;

wherein the determination module comprises:

a conversion unit, configured to convert the pixel sampling values of the video picture into pixel luminance values;

a first determination unit, configured to determine a maximum luminance value and a minimum luminance value in the pixel luminance values; and a second determination unit, configured to determine the quantization adjustment factor according to the maximum luminance value and the minimum luminance value;

wherein the second determination unit comprises:

a calculation subunit, configured to calculate a difference between the maximum luminance value and the minimum luminance value;

a first setting subunit, configured to set a first quantization adjustment factor equal to a linear weighted value of a logarithmic value of the difference; and a second setting subunit, configured to set the quantization adjustment factor equal to the first quantization adjustment factor, or set the quantization adjustment factor equal to a reciprocal value of the first quantization adjustment factor.

5. The apparatus as claimed in claim 4, wherein the encoding module comprises:

a first calibration unit, configured to calibrate sampling components of the pixel sampling values of the video picture according to the quantization adjustment factor, wherein the first calibration unit comprises: a first mapping subunit, configured to perform exponential mapping of the sampling components using a power value being set equal to the quantization adjustment factor or a weighted value of the quantization adjustment factor; and an encoding unit, configured to obtain conversion values of the sampling components according to output values obtained by calibration.

6. The apparatus as claimed in claim 4, wherein the writing module comprises:

a binarization unit, configured to perform binarization processing on a value of the quantization adjustment factor, wherein the binarization unit at least comprises one of the followings: a first conversion subunit, configured to convert the value of the quantization adjustment factor into a value represented in a binary form; a second conversion unit, configured to convert the value of the quantization adjustment factor into one or more integer values represented in corresponding binary forms; and a writing unit, configured to encode an output of the binarization processing, and write encoding bits into a data unit in the bitstream obtained by encoding the converted video picture, wherein the data unit comprises at least one of: a parameter set, a supplemental information unit, and a user-defined data unit.

7. A picture decoding method, comprising:

parsing a bitstream to obtain a quantization adjustment factor; and converting a reconstructed picture according to the quantization adjustment factor, wherein the reconstructed picture comprises: a picture obtained by decoding the bitstream, or a picture obtained by performing post-processing on the picture obtained by decoding the bitstream;

wherein parsing the bitstream to obtain the quantization adjustment factor comprises:

parsing a data unit in the bitstream to obtain a parameter for determining the quantization adjustment factor, wherein the data unit comprises at least one of: a parameter set, a supplemental information unit and a user-defined data unit; and determining a value of the quantization adjustment factor according to the parameter;

wherein determining the value of the quantization adjustment factor according to the parameter comprises:

setting the value of the quantization adjustment factor equal to a value of the parameter; or, setting the value of the quantization adjustment factor equal to an output value obtained by performing calculation on the parameter according to a preset operational rule.

8. The method as claimed in claim 7, wherein converting the reconstructed picture according to the quantization adjustment factor comprises:

calibrating sampling components of pixel sampling values of the reconstructed picture according to the quantization adjustment factor; and calculating conversion values of the sampling components according to output values obtained by calibration.

9. The method as claimed in claim 8, wherein a manner for calibrating the sampling components of the pixel sampling values of the reconstructed picture comprises: performing exponential mapping of the sampling components using a power value being set equal to the quantization adjustment factor or a weighted value of the quantization adjustment factor.

10. A picture decoding apparatus, comprising:

a decoding module, configured to parse a bitstream to obtain a quantization adjustment factor; and a conversion module, configured to convert a reconstructed picture according to the quantization adjustment factor, wherein the reconstructed picture comprises: a picture obtained by decoding the bitstream, or a picture obtained by performing post-processing on the picture obtained by decoding the bitstream;

wherein the decoding module comprises:

a decoding unit, configured to parse a data unit in the bitstream to obtain a parameter for determining the quantization adjustment factor, wherein the data unit comprises at least one of: a parameter set, a supplemental information unit and a user-defined data unit; and a third determination unit, configured to determine a value of the quantization adjustment factor determined according to the parameter;

wherein the third determination unit comprises:

a third setting subunit, configured to set the value of the quantization adjustment factor equal to the value of the parameter; or, a fourth setting subunit, configured to set the value of the quantization adjustment factor equal to an output value obtained by performing calculation on the parameter according to a preset operational rule.

11. The apparatus as claimed in claim 10, wherein the conversion module comprises:

a second calibration unit, configured to calibrate sampling components of pixel sampling values of the reconstructed picture according to the quantization adjustment factor; and a calculation unit, configured to calculate conversion values of the sampling components according to output values obtained by calibration.

12. The apparatus as claimed in claim 11, wherein the second calibration unit comprises: a second mapping subunit, configured to perform exponential mapping of the sampling components using a power value being set equal to the quantization adjustment factor or a weighted value of the quantization adjustment factor.

* * * * *